United States Patent [19]

Przybylski

[11] 4,009,372
[45] Feb. 22, 1977

[54] MANUAL OVERRIDE USING A VARIABLE CLOCK FREQUENCY IN A CONTROL SYSTEM EMPLOYING A D/A CONVERTER TO TRANSLATE DIGITAL CONTROL SIGNALS FROM A DIGITAL COMPUTER TO ANALOG SIGNALS FOR OPERATING PROCESS CONTROL DEVICES

[75] Inventor: Frank J. Przybylski, Feasterville, Pa.
[73] Assignee: Honeywell Inc., Minneapolis, Minn.
[22] Filed: Mar. 12, 1975
[21] Appl. No.: 557,791
[52] U.S. Cl. .................. 235/92 CC; 235/92 MP; 235/150.53; 235/197
[51] Int. Cl.² .......................... G06M 3/00
[58] Field of Search ............ 340/347 DA; 330/1 A; 235/92 MP, 92 CC, 151.11, 151.1, 150.53

[56] References Cited
UNITED STATES PATENTS

| | | | |
|---|---|---|---|
| 3,342,199 | 9/1967 | McEvoy | 137/88 |
| 3,435,196 | 3/1969 | Schmid | 235/92 CC X |
| 3,513,468 | 5/1970 | Fluegel | 340/347 DA |
| 3,529,138 | 9/1970 | Andre et al. | 235/197 X |
| 3,603,979 | 9/1971 | Kosakowski | 340/347 AD |
| 3,632,996 | 1/1972 | Paine | 235/92 CC X |
| 3,739,374 | 6/1973 | Kiowski | 340/347 DA |
| 3,754,235 | 8/1973 | Dummermuth et al. | 340/347 DA |
| 3,826,991 | 7/1974 | Hogan | 330/1 A |
| 3,866,024 | 2/1975 | Williams | 235/92 CC |
| 3,887,911 | 6/1975 | Bell | 340/347 DA |

OTHER PUBLICATIONS

"High Precision Position Control Servo System" D. Zivkovic Nuclear Instruments and Methods, 84, July (1970) pp. 13–20.

B407,357, Jan. 1, 1975, Segal, 235/92 CC.

*Primary Examiner*—Thomas J. Sloyan
*Attorney, Agent, or Firm*—Laurence J. Marhoefer; Lockwood D. Burton; Mitchell J. Halista

[57] ABSTRACT

Variable incrementation of an analog output signal is achieved by using a variable frequency clock generator for providing input signals to be counted by a presettable counter. The counter is preset by a digital word from a control processor which may include a digital computer. An output signal from the counter is applied to a digital-to-analog converter to produce a process control analog signal. The output signal of the variable frequency clock generator is obtained by a sequential selection of a plurality of differing fixed frequency signals from a frequency divider arranged to generate a plurality of lower frequency signals from a fixed frequency clock signal source. A second counter is driven by an output of the frequency divider to further subdivide the clock source signal. The stored count state of the second counter is decoded and the resulting sequential signals are applied to respective gates in combination with corresponding ones of the plurality of fixed frequency signals generated by the frequency divider. The counting operation by the second counter is, thus, effective to sequentially apply the differing frequency signals from the frequency divider through the gates to the presettable counter to increment the stored digital word at the respective frequency of the gated frequency signal.

3 Claims, 1 Drawing Figure

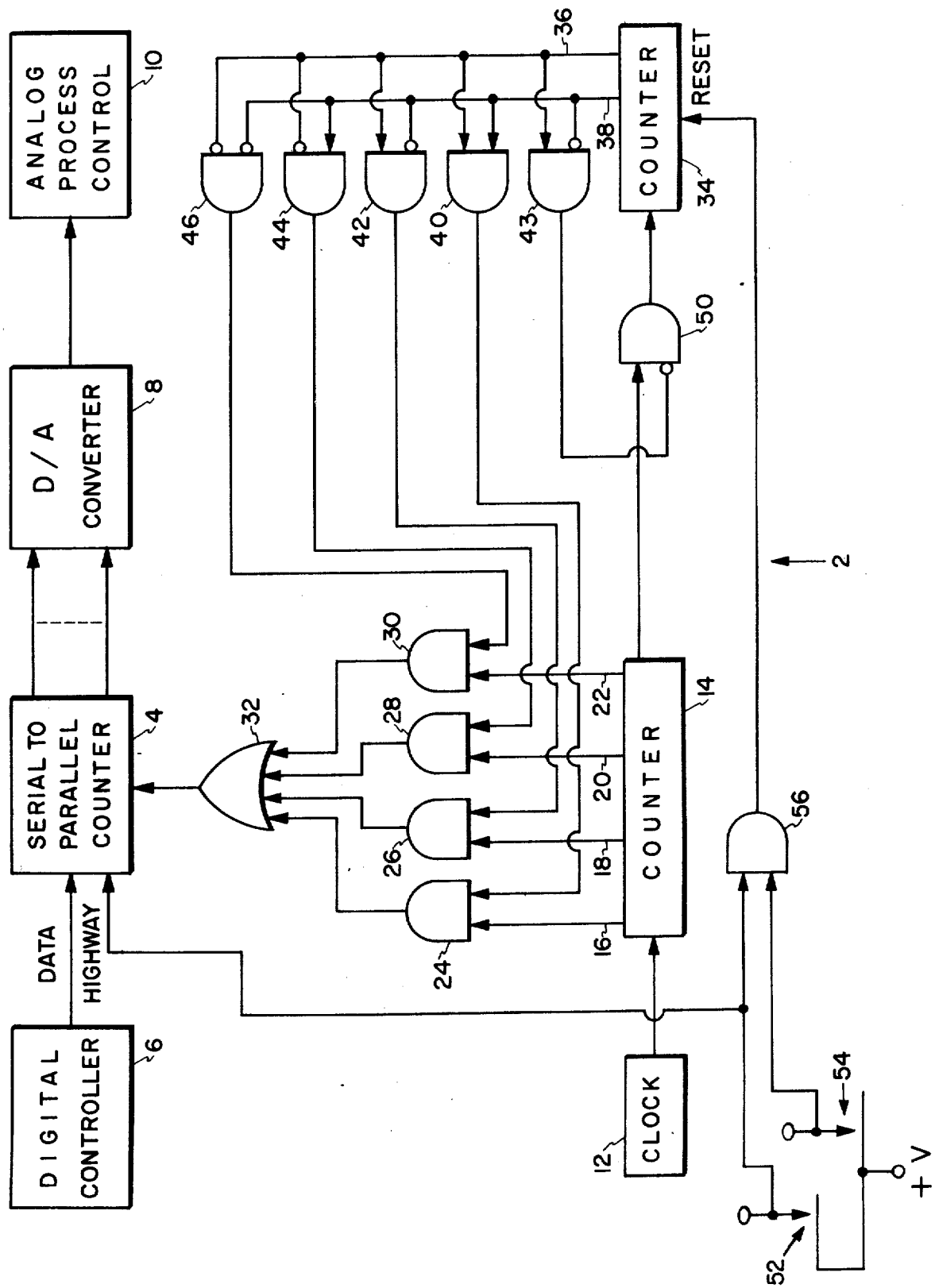

4,009,372

MANUAL OVERRIDE USING A VARIABLE CLOCK FREQUENCY IN A CONTROL SYSTEM EMPLOYING A D/A CONVERTER TO TRANSLATE DIGITAL CONTROL SIGNALS FROM A DIGITAL COMPUTER TO ANALOG SIGNALS FOR OPERATING PROCESS CONTROL DEVICES

CROSS REFERENCE TO CO-PENDING APPLICATION

Subject matter shown but not claimed herein is shown and claimed in a copending application of Francis J. Beck entitled "VARIABLE SPEED ANALOG SIGNAL INCREMENTATION CIRCUIT", filed on Apr. 22, 1975 and assigned to the same assignee as the present application.

BACKGROUND OF THE INVENTION

1. Field of the Invention

The present invention relates to digital-to-analog converters. More specifically, the present invention is directed to a digital-to-analog converter having a variable speed incrementation of a converter output signal.

2. Description of the Prior Art

Digital-to-analog converters are well-known in the art and are widely used in contemporary process control systems to translate digital control signals from a digital computer to analog signals for operating process control devices, e.g., valves. However, it is often desired to manually override a computer control directive by an operator located at the field mounted analog control device. Such a situation may arise from a failure of the remote digital computer to correctly control the analog device due to an equipment failure. Further, it often necessary for an operator to make rapid gross adjustments of the analog device upon the discovery of the need to override the computer control. Such gross adjustments are ultimately not needed as the final desired analog control value is approached. Accordingly, a reduction in the speed of incrementation must be provided following the gross adjustment period. Such a variable speed analog signal incrementation will allow an operator to rapidly achieve a desired analog signal value with gross changes while preventing overshoot as the desired value is ultimately attained with a fine analog signal changes. A prior art system for achieving a variable speed of an analog output signal is shown in U.S. Pat. No. 3,826,991 of James A. Hogan. However, this prior art system has a continuously varying output signal which is difficult to control by an operator where small changes are desired and it is not directly applicable to a digital control system inasmuch as the varying output signal is generated as an analog signal to be summed with another fixed analog control signal.

SUMMARY OF THE INVENTION

An object of the present invention is to provide an improved digital-to-analog signal converter circuit having a variable speed incrementation control for the converter analog output signal.

In accomplishing this and other objects, there has been provided, in accordance with the present invention, a variable speed analog signal incrementation circuit having a variable frequency pulse generator for selectively incrementing a stored digital word wherein the stored digital word is arranged to be applied as an input signal to a digital-to-analog converter. The variable frequency generator includes a first means for subdividing a fixed clock frequency signal into a plurality of differing predetermined frequency output signals and a second means for selectively connecting in succession each of the subdivided frequency output signals to the stored digital word to increment the digital word at a corresponding speed. A reset operation of the second means is selectively controlled to produce a restoration of a selection of a predetermined one of the subdivided frequency output signals.

BRIEF DESCRIPTION OF THE DRAWING

A better understanding of the present invention may be had when the following detailed description is read in connection with the accompanying drawing, in which the single FIGURE is a block diagram of a variable frequency analog control circuit embodying the present invention.

DESCRIPTION OF THE PREFERRED EMBODIMENT

Referring to the single FIGURE drawing in more detail, there is shown a variable speed analog signal incrementation control circuit having a variable frequency clock generator 2 for supplying a selectively variable frequency signal to a first counter circuit 4. The first counter 4 is, also, connected to a communication link, or data highway, to receive signals from a remote digital controller, or processor, 6 which is used to provide a digital output signal controlling an analog process variable, e.g., valve position. The count stored in the first counter 4 is applied to a digital-to-analog converter 8, hereinafter referred to as D/A converter 8, to be converted into an analog signal for controlling an analog process control device 10. The variable frequency clock generator 2 includes a fixed frequency clock circuit 12. An output signal from the clock circuit 12 is applied to a second counter 14 to be counted thereby. The counter 14 is effective to provide separate output signals on four respective output lines 16, 18, 20 and 22. The output signals on the output lines 16 to 22 represent a plurality of subdivided frequencies derived from the fixed frequency supplied by the clock circuit 12. Each of the output lines 16 to 22 is connected as one input to a respective one of a plurality of two-input AND gates 24, 26, 28 and 30 to apply a first input signal thereto. The outputs of the AND gates 24 to 30 are connected to a four-input OR gate 32. The output of the OR gate 32 is connected to the first counter 4 to supply a signal to be counted thereby.

A second input signal for each of the AND gates 24 to 30 is derived from a third counter 34 arranged to count a fifth subdivided frequency output signal from the first counter 14 which fifth output signal is selectively applied to the third counter 34 as hereinafter described. The third counter 34 is a two-stage counter having two output lines 36 and 38. The output lines 36 and 38 are connected to a plurality of gate circuits 40, 42, 44, 46 and 43 to form a decoder for the count stored in the third counter 34 wherein the four possible count states of the two-stage counter 34 are decoded into four output signals. These four output signals are applied to respective ones of the first-mentioned AND gates 24 to 30 as second input signals thereto. Additionally, a fifth output from the third counter 34, also representing one of the four count states, is applied as a first input to an AND gate 50 interposed between the first counter 14 and the second counter 34. A second input for the AND gate 50 is the aforesaid fifth subdivided frequency output signal from the second counter 14 on a fifth output line 51.

A pair of manual switches 52 and 54 are provided for controlling the "reset" operation of the third counter 34 and for applying a control signal to the first counter 4 to initiate a counting operation from the variable frequency clock generator. An input signal for both of these switches 52 and 54 is obtained from a positive source +V. The output signal from the first switch 52 is applied as a first input signal to an AND gate 56 and as a control signal to the first counter 4. The output signal from the second switch 54 is applied as a second input signal to the AND gate 56. The output signal from the AND gate 56 is applied at a "reset" signal to the third counter 34.

MODE OF OPERATION

In operation, the variable speed analog signal incrementation control circuit of the present invention is effective to provide a means for increasing the rate of the change in the analog output signal from the D/A converter 8 in sequential steps and to initiate selectively a lower rate of increase of the analog output signal when desired by an operator.

Specifically, the variable speed analog signal incrementation circuit of the present invention is used by an operator to manually vary the output current signal of the D/A converter 8 for controlling the analog process control element 10. The variable speed incrementation circuit provides a means for varying this output current from an initial slow rate of change to an increasing incrementation rate by a sequential progression to facilitate the ease and speed of adjustment by the operator of the analog output current from the D/A converter 8. The variable frequency generator circuit 2 generates variable frequency pulses which are applied to the serial-to-parallel counter 4 to increment, i.e., to change, the digital word stored therein from the digital controller 6. If the desired output current value from the D/A converter 8 is grossly dissimilar from the initial output current setting then a rapid, or high speed, incrementation of this initial current value is desired in order to expedite the arrival of the output current signal at the desired value. The illustrated variable speed incrementation circuit has an increasing frequency verses time relationship which accelerates the change in the output current from the D/A converter 8. When the desired output current signal from the D/A converter 8 is approached, the variable incrementation circuit of the present invention is manually restored to a slow speed, or low frequency, operation and, finally, is manually inactivated when the desired output current signal from the D/A converter 8 is reached. In the embodiment shown in the single FIGURE drawing, the variable frequency generating circuit 2 has a capability of operating at four successive and different speeds, or frequencies, which could be expanded to more than four speeds or decreased to less than four speeds. Further, the variable frequency generating circuit 2 could be rearranged by simply using control signals from different portions of the frequency dividing counter 14 to provide either a decreasing speed of operation or a periodically increasing and decreasing speed of operation. Thus, when both of the switches 52 and 54 are closed by an operator, the output signal from the variable frequency clock generator 2 circuit is progressively increased in sequential steps to a higher frequency. Specifically, when the switches 52 and 54 are closed, both of the input signals to the AND gate 56 are high level signals from the source +V. The AND gate 56 is arranged to produce a high level output signal in response to the high level input signals applied thereto. The high level output signal from the AND gate 56 is applied to the third counter 34 to allow a counting operation by the third counter 34. Concurrently, the first counter 4 is controlled by a high level signal from the first switch 52 to accept the variable frequency signals from the variable frequency clock generator circuit 2.

The second counter 14 is continuously driven by a fixed frequency output signal from the clock 12 to produce a plurality of different subdivided frequency output signals on its output lines 16 to 22. However, these output signals are blocked by the AND gates 24 to 30 until a decoded gate energizing signal is received from the third counter 34 and the AND gates 40 to 46. In a preferred embodiment, the first output line 16 from the counter 14 is arranged to supply the highest subdivided frequency output signal while the other output lines 18, 20 and 22 supply lower frequency subdivided frequency output signals in progressive steps. The fifth output line 51 is arranged to supply a still lower subdivided frequency output signal to the AND gate 50 for application to the third counter 34. The AND gates 40 to 46 are arranged to decode the binary states of the two-stage third counter 34, i.e., the binary state 00, 01, 10 and 11. This decoding operation is effective to produce four separate and sequential output signals which are applied to the AND gates 24 to 30 to sequentially energize these AND gates to allow the subdivided frequency output signals from the counter 14 to be sequentially applied to the OR gate 32. In order to provide for an incrementation of the digital word stored in the first counter 4 from a slow speed to a high speed, the gating of the subdivided frequency signals is arranged to proceed from a low frequency signal to a high frequency signal, i.e., increasing speed of incrementation.

The fifth AND gate 43 connected to the third counter 34 is also arranged to respond to one of the binary states of the third counter 34 to enable the AND gate 50 for controlling the fifth output signal from the second counter 14. Thus, when the third counter 34 is reset by a low level signal from the AND gate 56, the AND gate 50 is de-energized to block further subdivided frequency signals from the counter 14 from being applied to the counter 34 to change its count state from the "reset" condition. While this reset condition is effective to supply one of the binary states from the third counter 34 to the AND gates 24 to 30 for energizing the lowest AND gate connected to the frequency output line from the second counter 14, the first counter 4 is prevented from accepting this low frequency signal by a low level state from the first switch 52 which switch is concurrently opened with the second switch 54. Thus, when the switches 52 and 54 are opened by an operator, the circuit is returned to an initial state by resetting the third counter 34 wherein the next closure of the switches 52 and 54 is effective to start the lowest frequency of the subdivided frequency output signals from the counter 14 to be applied to the first counter 4 with a step-wise progression as described above to the highest frequency of the subdivided frequency output signals from the counter 14. Accordingly, when the analog process control variable 10 is initially varied by the operator, the incrementation is increased from a low frequency state to a high frequency state until a gross change has been made at which point the operator opens the switches 52 and 54 to restore the initial state of the counter 34. Subsequently, the fine adjustment of the analog process control variable 10 is made by the operator by reclosing the switches 52 and 54 for a short period of time which allows only the low frequency subdivided frequency output signals from the counter 14 to be applied to the first counter 4 to further increment the digital word stored therein. Inasmuch as a desired final state of the analog process control variable 10 would be achieved by a limited number of the low frequency incrementations thus produced, the operator would subsequently reopen the switches 52 and 54 before a higher frequency incrementation of the digital word in the counter 4 had been achieved by a subsequent sequential operation of the AND gates 24 to 30.

Accordingly, it may be seen that there has been provided, in accordance with the present invention, a variable speed incrementation control for an analog output signal from a digital-to-analog signal converter circuit.

The embodiments of the invention in which an exclusive property or privilege is claimed are defined as follows:

1. A variable speed analog signal incrementation circuit to provide a time dependent incrementation speed variation for a manual override in a control system comprising
    storage means for storing a digital word,
    input means for entering a digital word in said storage means,
    digital-to-analog signal converter means for converting the stored digital word to an analog output signal, and
    variable frequency signal generator means connected to said storage means for selectively incrementing the stored digital word by applying a variable frequency output signal to said storage means, said variable frequency generator means having a variable frequency mode of operation, said variable frequency signal generator means including means for generating a plurality of differing fixed frequency output signals including a fixed frequency clock means and a first counter means for counting output signals from said clock means to produce a plurality of subdivided fixed frequency output signals as the plurality of differing fixed frequency output signals, gating means for sequentially applying said plurality of fixed frequency output signals to said storage means according to a predetermined pattern encompassing said fixed frequency output signals and gating means including a second counter means arranged to count an output signal from said first counter means and means for decoding count states of said second counter means connected to said counter means and responsive to output signals from said counter means to produce control signals for said gating means to apply said variable frequency output signals to said storage means according to said pattern, and
    selectively operable reset means connected to said variable frequency signal generator means for selectively interrupting the operation of said signal generator means to terminate the incrementation of said stored digital word and for selectively restarting the operation of said generator means following such an interruption at a predetermined one of said fixed frequency output signals which is the lowest frequency signal of said fixed frequency output signals.

2. A variable speed analog signal incrementation circuit as set forth in claim 1 wherein said digital word storage means includes a third counter means arranged to add the variable frequency output signals to the stored digital word.

3. A variable speed analog signal incrementation circuit as set forth in claim 1 wherein said predetermined pattern of said fixed frequency output signals from said variable frequency generator means is a frequency progression from a low frequency to a high frequency by a series of frequency steps corresponding in number to the number of said differing fixed frequency output signals.

* * * * *